(12) United States Patent
Tanaka

(10) Patent No.: US 9,430,710 B2
(45) Date of Patent: Aug. 30, 2016

(54) TARGET-IMAGE DETECTING DEVICE, CONTROL METHOD AND CONTROL PROGRAM THEREOF, RECORDING MEDIUM, AND DIGITAL CAMERA

(71) Applicant: OMRON Corporation, Kyoto-shi, Kyoto (JP)

(72) Inventor: Kiyoaki Tanaka, Kyoto (JP)

(73) Assignee: OMRON Corporation, Kyoto (JP)

( * ) Notice: Subject to any disclaimer, the term of this patent is extended or adjusted under 35 U.S.C. 154(b) by 15 days.

(21) Appl. No.: 14/191,918

(22) Filed: Feb. 27, 2014

(65) Prior Publication Data
US 2014/0307918 A1   Oct. 16, 2014

(30) Foreign Application Priority Data

Apr. 15, 2013   (JP) ................. 2013-085298

(51) Int. Cl.
| | |
|---|---|
| *G06K 9/00* | (2006.01) |
| *G06K 9/03* | (2006.01) |
| *H04N 5/232* | (2006.01) |
| *H04N 5/77* | (2006.01) |
| *H04N 5/907* | (2006.01) |
| *H04N 9/804* | (2006.01) |

(52) U.S. Cl.
CPC ............ *G06K 9/03* (2013.01); *G06K 9/00261* (2013.01); *H04N 5/23219* (2013.01); *H04N 5/772* (2013.01); *H04N 5/907* (2013.01); *H04N 9/8047* (2013.01)

(58) Field of Classification Search
None
See application file for complete search history.

(56) References Cited

U.S. PATENT DOCUMENTS

| | | | | |
|---|---|---|---|---|
| 2007/0229673 A1* | 10/2007 | Araya | ............... | H04N 5/23232 348/220.1 |
| 2010/0284568 A1* | 11/2010 | Tojo | ............... | G06K 9/00261 382/103 |

FOREIGN PATENT DOCUMENTS

| | | |
|---|---|---|
| JP | 2009-005239 A | 1/2009 |
| JP | 2013-003634 A | 1/2013 |

* cited by examiner

*Primary Examiner* — Siamak Harandi
(74) *Attorney, Agent, or Firm* — Osha Liang LLP

(57) ABSTRACT

A method for controlling a target-image detecting device configured to detect a target image as a part of photographed images and as an image of a target object from the photographed images, includes sequentially obtaining a plurality of the photographed images that form a moving image, detecting a target image included in the obtained photographed image, generating a detection result and accumulating the generated detection result in memory as detection history, referring to the detection history of the memory and deciding whether the detection result of the target image of the same target object is included in a latest predetermined number of detection results, outputting the detection result when the detection result is included, and not outputting the detection result when the detection result is not included.

7 Claims, 6 Drawing Sheets

FIG. 5

|  | Input | Output |
|---|---|---|
| First frame | ID1 | – (Undetected) |
| Second frame | ID1, ID2 | – (Undetected) |
| Third frame | ID1 | ID1 |
| Fourth frame | ID1 | ID1 |
| Fifth frame | ID1 | ID1 |
| Sixth frame | ID1, ID3 | ID1 |

FIG. 6

|  | Input | Output |
|---|---|---|
| First frame | ID1 | – (Undetected) |
| Second frame | – (Undetected) | – (Undetected) |
| Third frame | ID2 | – (Undetected) |
| Fourth frame | – (Undetected) | – (Undetected) |
| Fifth frame | ID3 | – (Undetected) |
| Sixth frame | – (Undetected) | – (Undetected) |
| Seventh frame | ID4 | – (Undetected) |
| Eighth frame | – (Undetected) | – (Undetected) |
| Ninth frame | ID5 | – (Undetected) |
| Tenth frame | – (Undetected) | – (Undetected) |
| Eleventh frame | ID6 | – (Undetected) |
| Twelfth frame | – (Undetected) | – (Undetected) |
| Thirteenth frame | ID7 | – (Undetected) |
| Fourteenth frame | ID7 | ID7 |
| Fifteenth frame | ID7 | ID7 |

FIG. 7

|  | Input | Output |
|---|---|---|
| First frame | – (Undetected) | – (Undetected) |
| Second frame | ID1 | – (Undetected) |
| Third frame | – (Undetected) | – (Undetected) |
| Fourth frame | ID1 | – (Undetected) |
| Fifth frame | – (Undetected) | ID1 |
| Sixth frame | ID1 | ID1 |
| Seventh frame | ID1 | ID1 |

FIG. 8

|  | Input | Output |
|---|---|---|
| First frame | ID1 | – (Undetected) |
| Second frame | ID1 | – (Undetected) |
| Third frame | ID1 | ID1 |
| Fourth frame | ID1 | ID1 |
| Fifth frame | ID1 | ID1 |
| Sixth frame | ID1 | ID1 |
| Seventh frame | ID1 | ID1 |

FIG. 9

|  | Input | Output |
|---|---|---|
| 0.0 second | ID1 | – (Undetected) |
| 0.2 seconds | ID1 | – (Undetected) |
| 0.4 seconds | ID1 | – (Undetected) |
| 0.6 seconds | ID1 | – (Undetected) |
| 0.8 seconds | ID1 | – (Undetected) |
| 1.0 second | ID1 | – (Undetected) |
| 1.2 seconds | ID1 | – (Undetected) |
| 1.4 seconds | ID1 | – (Undetected) |
| 1.6 seconds | ID1 | – (Undetected) |
| 1.8 seconds | ID1 | – (Undetected) |
| 2.0 seconds | ID1 | – (Undetected) |
| 2.2 seconds | ID1 | ID1 |
| 2.4 seconds | ID1 | ID1 |

TARGET-IMAGE DETECTING DEVICE, CONTROL METHOD AND CONTROL PROGRAM THEREOF, RECORDING MEDIUM, AND DIGITAL CAMERA

BACKGROUND

1. Field

The present invention relates to a target-image detecting device that detects a target image as a part of photographed images and as an image of a target object from the photographed images, a control method and a control program of the target-image detecting device, a recording medium, and a digital camera.

2. Related Art

Conventionally, in order to provide a user interface that can be easily used and to automatically obtain an optimum image in an imaging device, a display device, and the like, there has been an increasing need for automatically recognizing a photographing target or a display target. As an example of such a need, there are functions of detecting a face image (target image) as an image of a face (target object) such as a person and an animal, adjusting the detected face image to obtain optimum focus and exposure, recognizing a character (target image), and automatically setting the recognized region as an object of OCR (Optical Character Recognition).

In such a technique of automatic recognition, there are cases of occurrence of erroneous recognition (erroneous detection), and occurrence of a temporary failure of recognition (detection).

For example, an image that is erroneously recognized is detected and not detected in some cases. In the encoding processing device described in Japanese Patent Unexamined Publication No. 2009-005239, even when a face region is detected in a certain frame, detection history of the face region detected in the concerned frame is decided as invalid when the face region is not continuously detected in a predetermined number or more of continuous frames after the concerned frame.

Further, an image of which recognition temporarily failed is thereafter continuously successfully recognized in many cases. The compartment-line recognizing device described in Japanese Patent Unexamined Publication No. 2013-003634 is for detecting an image (target image) of a compartment line from a photographed image of a road surface. Even when an image of the concerned compartment line is detected at less than a predetermined number of times, the compartment-line recognizing device makes the re-detection as firm when the image is continuously re-detected at a predetermined number of times. Accordingly, a compartment line that is once undetected can be properly re-detected.

SUMMARY

A target image that is erroneously recognized is detected and not detected in some cases as described above, and accordingly, detection information is output and not output. Therefore, when a detection frame (detection mark) that indicates detection of a target image is attempted to be displayed in a region of the detected target image, for example, the detection frame is displayed and not displayed in some cases. As a result, visual quality is poor.

One or more embodiments of the present invention provides a target-image detecting device capable of preventing output of a detection result of an erroneously detected target image.

A target-image detecting device according to one or more embodiments of the present invention is a device that detects a target image as a part of photographed images and as an image of a target object from the photographed images. According to one or more embodiments of the present invention, the target-image detecting device includes a memory unit configured to store information, an obtaining unit configured to sequentially obtain a plurality of the photographed images which configure a moving image, a detecting unit configured to detect a target image included in the photographed image which is obtained by the obtaining unit, generate a detection result, and accumulate the generated detection result in the memory unit as detection history, and a deciding unit configured to refer to the detection history of the memory unit, decide whether the detection result of a target image of the same target object is included in a latest predetermined number of detection results, and output the detection result when the detection result is included, and not to output the detection result when the detection result is not included.

A method for controlling a target-image detecting device according to one or more embodiments of the present invention is a method for detecting a target image as a part of photographed images and as an image of a target object from the photographed images. According to one or more embodiments of the present invention, the method includes an obtaining step of sequentially obtaining a plurality of the photographed images which configure a moving image, a detecting step of detecting a target image included in the photographed image obtained in the obtaining step, generating a detection result, and accumulating the generated detection result in the memory unit as detection history, and a deciding step of referring to the detection history of the memory unit, deciding whether a detection result of a target image of the same target object is included in a latest predetermined number of detection results, and outputting the detection result when the detection result is included, and not outputting the detection result when the detection result is not included.

According to the above configuration and method, a plurality of photographed images that configure a moving image are sequentially obtained. A target image included in the obtained photographed image is detected, and the detection result is accumulated in the memory unit as detection history. In general, a target image that is erroneously recognized is detected and not detected from the photographed image in some cases. Therefore, in one or more embodiments of the present invention, it is decided whether a detection result of a target image of the same target object is included in a latest predetermined number of detection results. When a detection result of a target image of the same target object is included, the detection result is output as a proper detection. When a detection result of a target image of the same target object is not included, the detection result is not output. Accordingly, output of a detection result of an erroneously detected target object can be prevented.

The predetermined number is an integer equal to or larger than one. A decision whether a target object of a target image is the same is made based on at least one of information such as a position, a size, and similarity.

In the target-image detecting device according to one or more embodiments of the present invention, the deciding unit may decide whether a target image of which a target object is the same as that of the target image detected by the detecting unit is included in a latest predetermined number of detection results. In this case, a detection result of a target image that is continuously detected is output, and other detection results are not output. Therefore, output of a detection result of an erroneously detected target object can be securely prevented.

Even when an image is a target image to be detected, the image is not always continuously detected, and cannot be temporarily detected in some cases. In this case, a detection mark such as a detection frame temporarily disappears, and poor visual quality may occur.

In the target-image detecting device according to one or more embodiments of the present invention, the deciding unit may decide whether a detection result of a target image of the same target object is included in at least a predetermined number of detection results during a latest predetermined period. In this case, even when a target image cannot be temporarily detected, a detection result of the target image can be detected when at least a predetermined number of the target images are detected during a latest predetermined period. As a result, temporary inability of detection can be prevented.

In the target-image detecting device according to one or more embodiments of the present invention, the detecting unit accumulates identification information for identifying the detected target image in the memory unit by relating the identification information to the detection result, and when a target image of which a target object detected this time is the same as that of the target image detected in the past, the detecting unit accumulates identification information that is the same as identification information of the target image detected in the past in the memory unit by relating the identification information to a detection result of the target image detected this time, and, according to one or more embodiments of the present invention, the deciding unit makes the decision by using the identification information of the target image. In this case, since the deciding unit can make the decision by using only identification information of the target image from history information of the memory unit, quick processing and operation become possible.

The following digital camera has an effect similar to that described above, the digital camera including a photographing unit configured to perform photographing of a subject and generate a plurality of photographed images which configure a moving image, and a display unit configured to display information, wherein the digital camera includes a target-image detecting device that detects a target image as a part of the photographed images and as an image of a target object from the photographed images, and a synthesizing unit configured to synthesize a detection mark indicating detection of the target image with the photographed image and make the display unit display the synthesized image, based on the detection result from the target-image detecting device. For the detection mark, an arbitrary mark such as a detection frame that indicates a region of the detected target image can be used.

The target-image detecting device according to one or more embodiments of the present invention may be realized by a computer. In this case, a control program of a target-image detecting device for realizing the target-image detecting device by making the computer operate as each unit included in the target-image detecting device, and a computer-readable recording medium in which the control program is recorded are also within a category of one or more embodiments of the present invention.

As described above, the target-image detecting device according to one or more embodiments of the present invention decides whether a detection result of a target image of the same target object is included in a latest predetermined number of detection results. When a detection result of a target image of the same target object is included, the target-image detecting device outputs the detection result as a proper detection. When a detection result of a target image of the same target object is not included, the target-image detecting device does not output the detection result. Therefore, there is an effect that output of a detection result of an erroneously detected target object can be prevented.

BRIEF DESCRIPTION OF THE DRAWINGS

FIG. 5 is a view showing, in a table form, input data and output data of each frame, for an example of a proper-detection deciding unit in the digital camera;

FIG. 6 is a view showing, in a table form, input data and output data of each frame, for another example of the proper-detection deciding unit;

FIG. 7 is a view showing, in a table form, input data and output data of each frame, for still another example of the proper-detection deciding unit;

FIG. 8 is a view showing, in a table form, input data and output data of each frame, for yet another example of the proper-detection deciding unit;

FIG. 9 is a view showing, in a table form, input data and output data of each frame, for further another example of the proper-detection deciding unit.

DETAILED DESCRIPTION (Outline of Digital Camera)

Embodiments of the present invention are described with reference to FIGS. 1 to 4. In the following, the "same face image" means that "a face image (target image) of a face as a target object is the same". In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
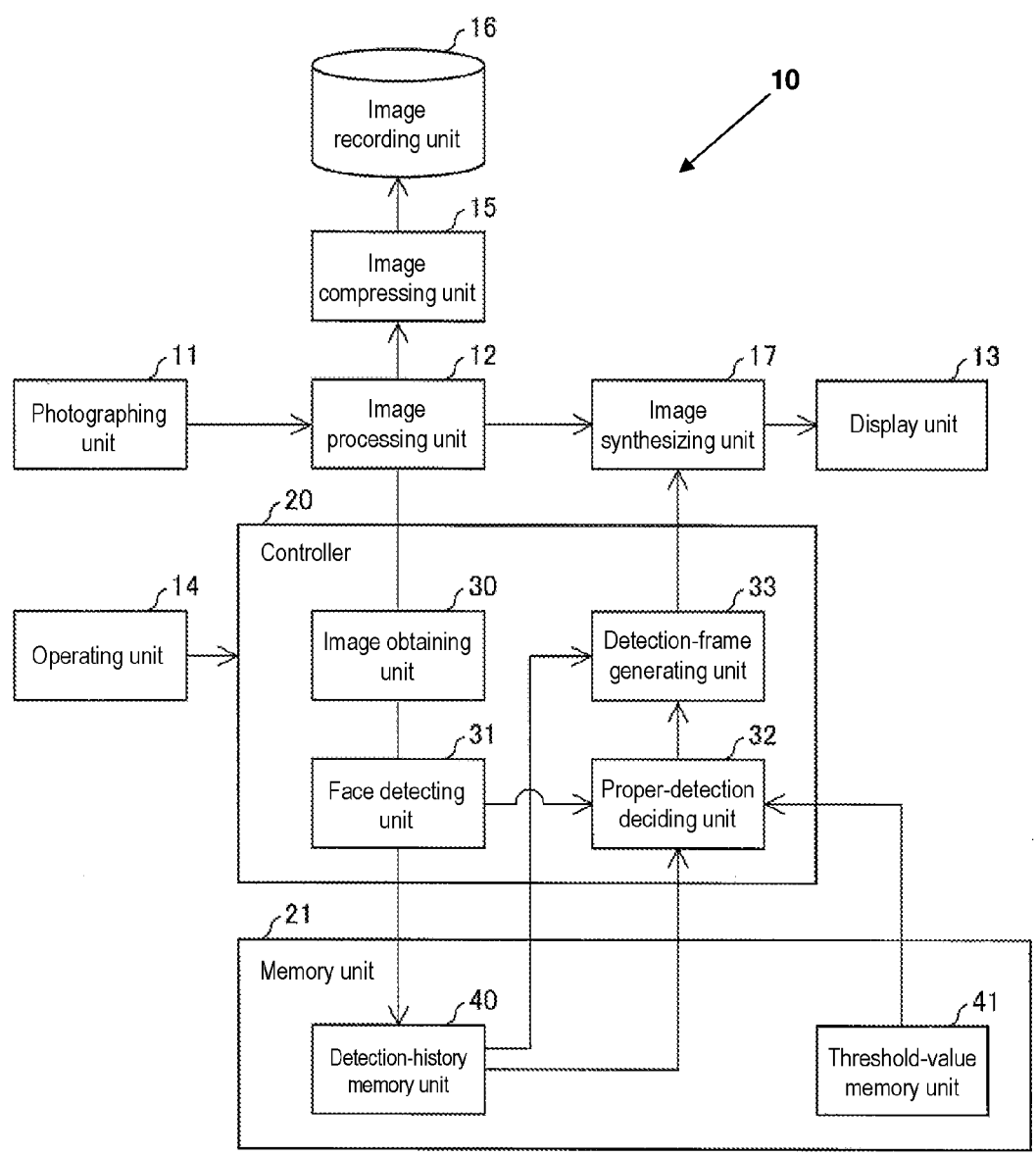
FIG. 1 is a block diagram showing a schematic configuration of a digital camera according to one or more embodiments of the present invention.
Figure 2C:
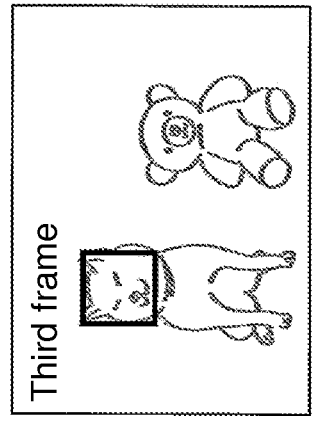
FIGS. 2A-2F are views showing an example of transition of a display image displayed by a display unit of the digital camera.
Figure 2F:
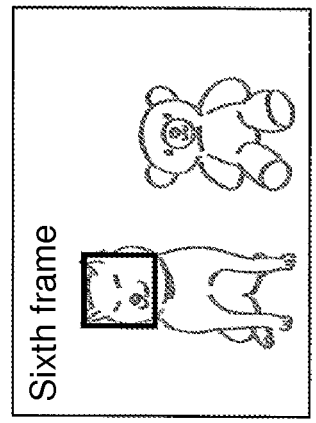
Figure 2B:
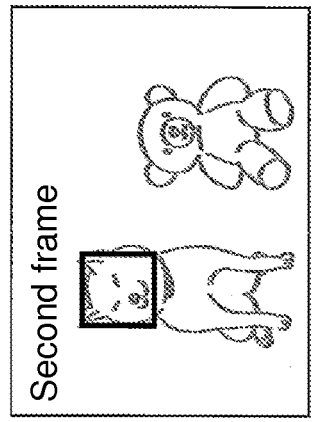
Figure 2E:
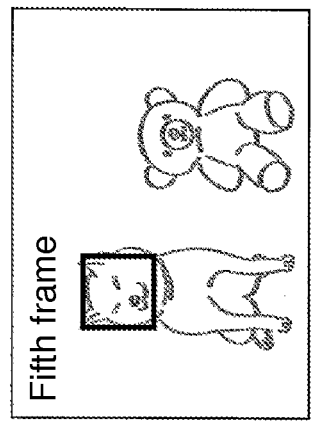
Figure 2A:
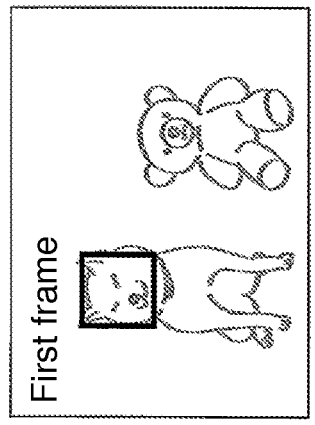
Figure 2D:
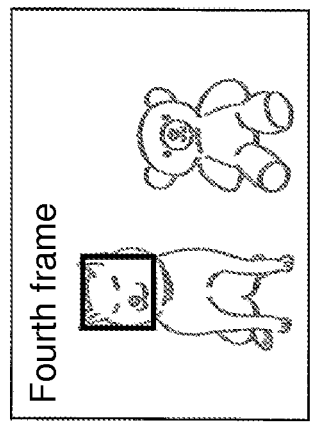

FIG. 1 is a block diagram showing a schematic configuration of a digital camera according to one or more embodiments of the present invention. As shown in FIG. 1, in a digital camera 10, a photographing unit 11 photographs and sequentially generates a plurality of photographed images that configure a moving image. An image processing unit 12 sequentially processes the images, and a display unit 13 sequentially displays the images as live-view images. In the digital camera 10, when a user presses a shutter button (not shown) of an operating unit 14, an image compressing unit 15 image-compresses the photographed images that are image-processed by the image processing unit 12. Thereafter, the image-processed photographed images are recorded by an image recording unit 16.

(Details of Digital Camera)

Next, details of the digital camera 10 according to one or more embodiments of the present invention are described. As described above, the digital camera 10 includes the photographing unit 11, the image processing unit 12, the display unit 13, the operating unit 14, the image compressing unit 15, the image recording unit 16, and an image synthesizing unit (synthesizing unit) 17. Further, as shown in FIG. 1, the digital camera 10 includes a controller (target-image detecting device) 20 and a memory unit 21.

The photographing unit 11 is for photographing a subject, and includes an optical system such as a lens group, a diaphragm, and an imaging element, and includes a circuit system such as an amplifier and an A/D converter. As examples of the imaging element, there are a CCD and a CMOS (Complementary Metal-oxide Semiconductor) image sensor. The photographing unit 11 generates photographed images by the photographing, converts the photographed images into data of the photographed image, and transmits data-converted photographed images to the image processing unit 12.

The image processing unit 12 is for performing image processing such as a matrix calculation, a gamma correction, adjustment of a white balance, to the data of photographed images from the photographing unit 11. The image processing unit 12 generates data of photographed images for display, for recording, and for face detection, from the image-processed, photographed images, and transmits the generated data of photographed images to the display unit 13, the image compressing unit 15, and the controller 20. The data of photographed images for display and for face detection may be the same.

The image synthesizing unit 17 is for synthesizing an image (for example, an image for an OSD (On-Screen Display)) from the controller 20, to the photographed images from the image processing unit 12. The image synthesizing unit 17 transmits data of a synthetic image as a synthesized image, to the display unit 13.

The display unit 13 is configured by display devices such as an LCD (Liquid-Crystal Display Element), an organic EL (Electroluminescence) display, and a plasma display. The display unit 13 display-outputs various information such as characters and images, based on data of a synthetic image from the image synthesizing unit 17.

The operating unit 14 is for receiving various inputs from the user based on a user's operation, and is configured by an input button, a touch panel, and other input devices. The operating unit 14 converts user-operated information into operation data, and transmits the operation data to the controller 20. As other examples of an input device, there are pointing devices such as a keyboard, a numerical keypad, and a mouse.

The image compressing unit 15 is for compressing data of photographed images from the image processing unit 12, in accordance with a system such as JPEG (Joint Photographic Experts Group) and MPEG (Moving Picture Expert Group). The image compressing unit 15 records the compressed data of photographed images in the image recording unit 16.

The image recording unit 16 is for recording information, and is particularly for recording data of photographed images compressed by the image compressing unit 15. The image recording unit 16 is configured by a nonvolatile storage device such as a flash memory and a hard disc.

The controller 20 integrally controls operations of various configurations in the digital camera 10. The controller 20 is configured by a computer including a CPU (Central Processing Unit) and a memory, for example, and performs operation control of various configurations by making the computer execute control programs. Details of the controller 20 are described later.

The memory unit 21 is configured by a nonvolatile storage device such as a flash memory and a ROM (Read Only Memory), and a volatile storage device such as a RAM (Random Access Memory). Contents that are stored in the nonvolatile storage device are the control programs, OS (operating system) programs, other various programs, and various operation set values. On the other hand, contents that are stored in the volatile storage device are work files, temporary files, and the like. Details of the memory unit 21 are described later.

In one or more embodiments of the present invention, the controller 20 obtains photographed images processed by the image processing unit 12, detects a face image included in the obtained photographed images, generates an image of a detection frame (detection mark) indicating a region of a detected face image, and transmits the generated image of the detection frame to the image synthesizing unit 17. Accordingly, the image synthesizing unit 17 synthesizes an image of a detection frame from the controller 20, to the photographed images from the image processing unit 12. The synthesized synthetic image is display-output via the display unit 13.

In one or more embodiments of the present invention, the controller 20 decides whether a face image that is the same as a face image detected this time is included by a predetermined number in the latest predetermined number (two, for example) of photographed images. That is, the controller 20 decides whether a face image that is the same as a face image detected this time is continuously included at (predetermined number plus one) times including the photographed image this time. When the controller 20 decides that a face image that is the same as a face image detected this time is continuously included, the controller 20 decides that the face image has not been erroneously detected but has been properly detected, and generates the image of the detection frame. On the other hand, when the controller 20 decides that a face image that is the same as a face image detected this time is not continuously included, the controller 20 decides that there is a possibility that the face image has been erroneously detected, and omits generation of the image of the detection frame. In one or more embodiments of the present invention, even when a face image is detected in a photographed image, a detection frame is not displayed immediately. A detection frame is displayed when a face image has been continuously detected at (predetermined number plus one) or more times.

FIGS. 2A-2F are views showing an example of a synthetic image sequentially displayed by the digital camera 10 according to one or more embodiments of the present invention. On the other hand, FIGS. 10A-10F are views showing an example of a synthetic image sequentially displayed by a conventional digital camera, as a comparative example. In the examples of FIGS. 2A-2F and FIGS. 10A-10F, a face image of a dog is detected in all photographed images of first to sixth frames. However, a face image of a stuffed toy of a bear is erroneously detected in photographed images of second and sixths frames in the example of FIGS. 10A-10F.

When the conventional digital camera detects a face image from a photographed image, the digital camera synthesizes an image of a detection frame in a region of the detected face image, to the photographed image, and displays the synthesized image. Therefore, as shown in FIG. 10A to FIG. 10F, a detection frame fd concerning the face image of the dog is displayed in all of the first to sixth frames. On the other hand, a detection frame fb concerning the face image of the stuffed toy of the bear is displayed in only the second and sixth frames. Therefore, the detection frame flashes, and visual quality is poor and a display quality becomes low.

On the other hand, in the digital camera 10 according to one or more embodiments of the present invention, as shown in FIG. 2A to FIG. 2F, concerning the face image of the dog, the face image is detected only once in the first frame. Therefore, the detection frame fd is not displayed. In the second frame, since the face image is continuously detected at only two times, the detection frame fd is not displayed. In the third frame and after the third frame, since the face image of the dog is continuously detected at three or more times, the detection frame fd is displayed. As described above, in one or more embodiments of the present invention, even when proper detection is performed, the detection frame fd is not displayed in a predetermined number of frames at the beginning of the detection. However, since a period of one frame is 1/30 second, which is extremely a short period for the user, this does not become a problem.

On the other hand, concerning the face image of the stuffed toy of the bear, the face image is not detected in the first, third, fourth, and fifth frames. Therefore, the detection frame fb is not displayed. In the second and sixth frames, the face image is detected only once. Therefore, the detection frame fb is not displayed. That is, Since there are no frames that are continuously detected at three or more times, the detection frame fb is not displayed. Therefore, flash of the detection frame due to erroneous detection can be prevented, and reduction of a display quality can be prevented.

(Details of Controller and Memory Unit)

Next, details of the controller 20 and the memory unit 21 are described with reference to FIG. 1. In FIG. 1, configurations concerning detection of a face image are shown in the controller 20 and the memory unit 21. As shown in FIG. 1, the controller 20 includes an image obtaining unit (obtaining unit) 30, a face detecting unit (detecting unit) 31, a proper-detection deciding unit (deciding unit) 32, and a detection-frame generating unit (synthesizing unit) 33. The memory unit 21 includes a detection-history memory unit 40 and a threshold-value memory unit 41.

The detection-history memory unit 40 accumulates a detection result of the face detection as detection history. The detection result includes an ID (Identification Information) (hereinafter, "face ID") of a detected face image, feature information, size, and position information. Further, the detection result may include a detection date and time of a detected face image and other information. The threshold-value memory unit 41 stores a threshold value for deciding whether a detection is a proper detection.

The image obtaining unit 30 is for obtaining data of a photographed image from the image processing unit 12. Upon obtaining data of the photographed image, the image obtaining unit 30 transmits the obtained data of the photographed image to the face detecting unit 31.

The face detecting unit 31 has a face detecting function of detecting a face image from a plurality of face images concerning a moving image consisting of the face images in time series, and a face trace function of tracing the face image by detecting the detected face image from subsequent photographed images. For detecting a face image, known face detection techniques can be used such as using template matching, detecting a skin-color region, detecting an outline of a face, and detecting a feature point of a face.

Specifically, upon receiving data of the photographed image from the image obtaining unit 30, the face detecting unit 31 detects a face image from the photographed image. The face detecting unit 31 accumulates a detection result of the detected face image as detection history in the detection-history memory unit 40, and also transmits a face ID out of the detection result to the proper-detection deciding unit 32.

Further, the face detecting unit 31 refers to the detection history of the detection-history memory unit 40, and decides whether a face image that is the same as a latest detected face image is present in the face image detected this time (face trace). The face detecting unit 31 applies the same face ID to the same face image. A detailed process of face detection and face trace performed by the face detecting unit 31 is the same as a conventional process, and therefore, the description of the detailed process is omitted.

The proper-detection deciding unit 32 decides whether detection of a face image by the face detecting unit 31 is proper. Specifically, the proper-detection deciding unit 32 refers to the detection-history memory unit 40, and decides whether the face ID received from the face detecting unit 31 is included in the detection history of latest predetermined number (two, for example) of frames. When the face ID is included in the detection history, the proper-detection deciding unit 32 decides the detection as proper detection, and transmits the face ID to the detection-frame generating unit 33. On the other hand, when the face ID is not included in the detection history, the proper-detection deciding unit 32 decides the detection as not proper detection, and omits transmission of the face ID to the detection-frame generating unit 33. When a face ID to be transmitted is not present, the proper-detection deciding unit 32 may not transmit any face ID or may notify that a face image has not been detected (undetected), to the detection-frame generating unit 33.

The detection-frame generating unit 33 is for generating an image of a detection frame indicating that a face image has been detected. Specifically, upon obtaining a face ID from the proper-detection deciding unit 32, the detection-frame generating unit 33 searches a size and position information corresponding to the obtained face ID, from the detection history of the detection-history memory unit 40. Next, the detection-frame generating unit 33 generates an image of a detection frame in accordance with the searched size and position information, and transmits data of the generated image of the detection frame to the image synthesizing unit 17. Accordingly, the image synthesizing unit 17 synthesizes the image of the detection frame from the detection-frame generating unit 33, to the photographed image from the image processing unit 12, and display-outputs the synthesized image via the display unit 13.

(Processing Operation of Controller)

Figure 3:
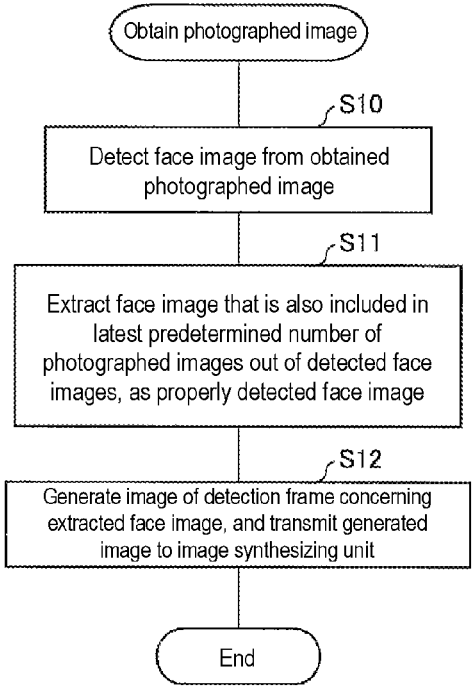
FIG. 3 is a flowchart showing a flow of a process performed by a controller of the digital camera.

Next, a processing operation of the controller 20 in the above configuration is described. FIG. 3 is a flowchart showing a flow of the process performed by the controller 20. As shown in FIG. 3, when the image obtaining unit 30 obtains a photographed image in a moving image photographed by the photographing unit 11, the face detecting unit 31 detects a face image from the obtained photographed image, and accumulates a detection result as detection history in the detection-history memory unit 40 (S10). Next, the proper-detection deciding unit 32 extracts a face image that is also included in a latest predetermined number of photographed images out of face images detected by the face detecting unit 31, as a properly detected face image (S11).

The detection-frame generating unit 33 generates an image of a detection frame concerning the face image extracted by the proper-detection deciding unit 32, by referring to the detection history of the detection-history memory unit 40, and transmits the generated image to the image synthesizing unit 17 (S12). As a result, a photographed image that is image-processed by the image processing unit 12 is synthesized with the image of the detection frame by the image synthesizing unit 17, and the synthesized image is displayed by the display unit 13. Thereafter, the process of the controller 20 is ended.

Figure 4:
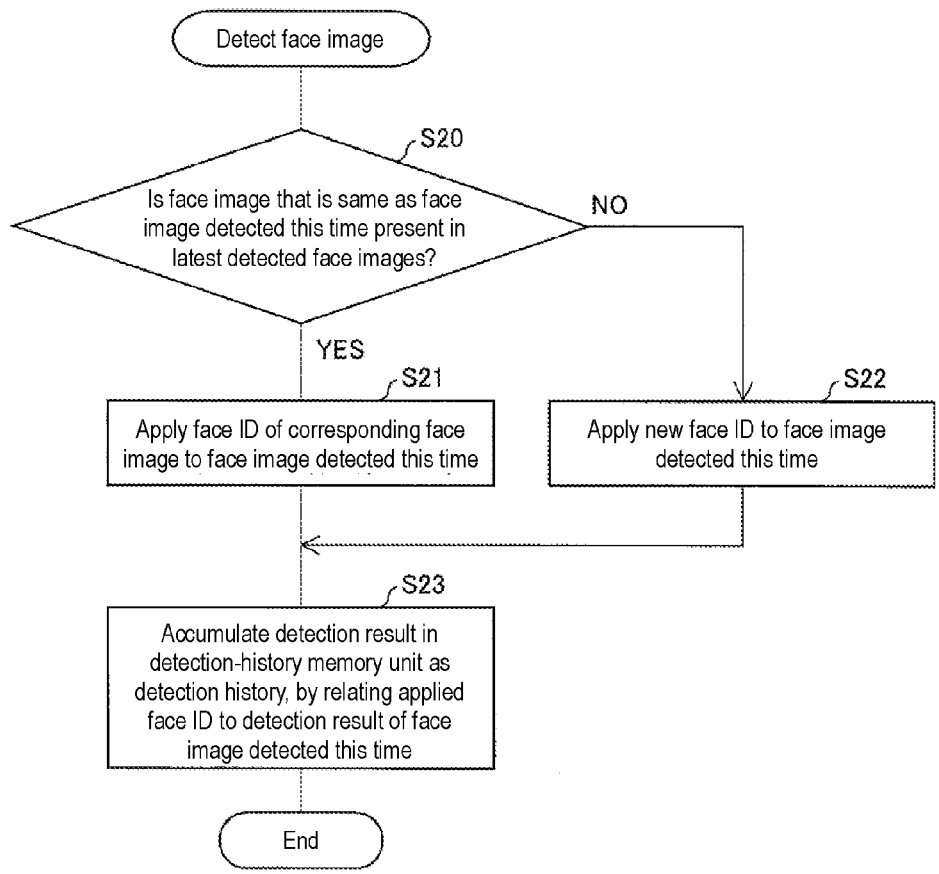
FIG. 4 is a flowchart showing a face detection process performed by a face detecting unit of the controller.
Figure 10C:
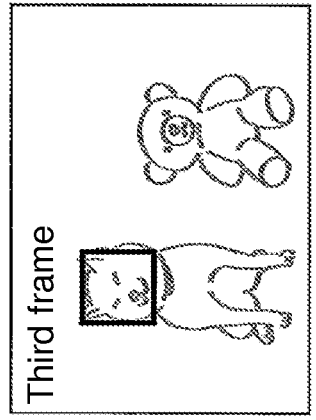
FIGS. 10A-10F are views showing an example of transition of a display image displayed by a display unit of a conventional digital camera.
Figure 10F:
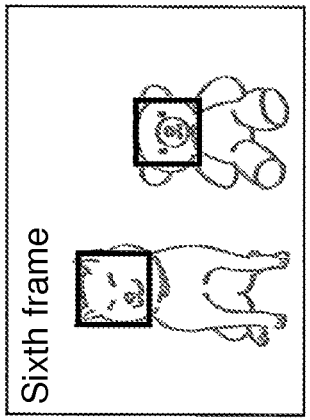
Figure 10B:
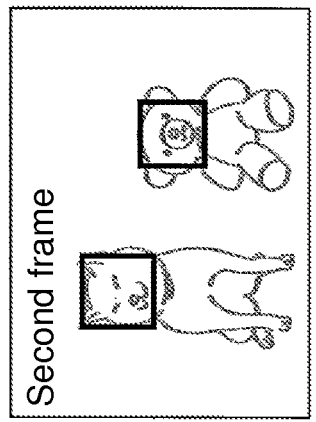
Figure 10E:
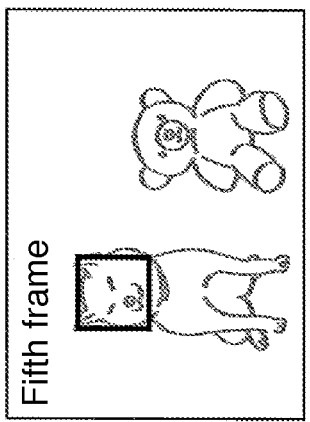
Figure 10A:
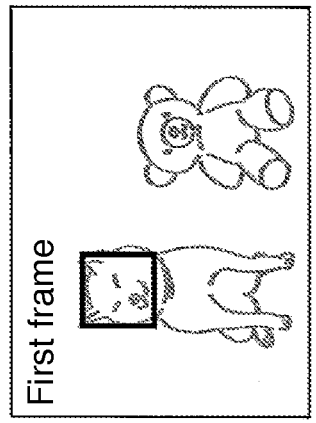
Figure 10D:
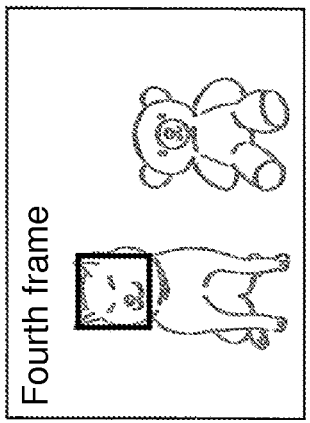

Next, processing operations of the face detecting unit 31 and the proper-detection deciding unit 32 in the controller 20 are described. FIG. 4 is a flowchart showing a flow of a face detection process performed by the face detecting unit 31. The face detection process is executed for each detected face image.

As shown in FIG. 4, upon detecting a face image from a photographed image, the face detecting unit 31 refers to the detection history of the detection-history memory unit 40, and decides whether a face image that is the same as the face image detected this time is present in latest detected face images (S20). When a face image that is the same as the face image detected this time is present, the face detecting unit 31 applies a face ID of the corresponding face image to the face image detected this time (S21). When a face image that is the same as the face image detected this time is not present, the face detecting unit 31 applies a new face ID to the face image detected this time (S22). Next, by relating the applied face ID to the detection result of the face image detected this time, the face detecting unit 31 accumulates the detection result in the detection-history memory unit 40 as detection history (S23). Thereafter, the face detection process is ended.

(Example 1)

Next, an example of the operation of the proper-detection deciding unit 32 is described with reference to FIG. 5. FIG. 5 is a view showing, in a table form, an example of data that is input and output by the proper-detection deciding unit 32 for each frame. The example of FIG. 5 corresponds to the example of FIGS. 2A-2F.

In the example shown in FIG. 5, the face detecting unit 31 applies ID1 as the face ID to the face image of the dog that is detected in the first frame and that is traced afterward. The face detecting unit 31 applies ID2 as the face ID of the face image of the stuffed toy of the bear, when the face image is detected in the second frame. Since the face image is not able to be detected in the third to fifth frames, the face image cannot be traced. Therefore, when the face image is detected in the sixth frame, ID3 that is different from ID2 is applied as a face ID.

In the example of FIG. 5, the proper-detection deciding unit 32 does not output any face ID, by deciding that a face image has not been detected, because latest two frames are not present although ID1 is input in the first frame. In the second frame, although ID1 and ID2 are input, latest two frames are not present. Therefore, the proper-detection deciding unit 32 does not output any face ID, by deciding that a face image has not been detected. In the third to fifth frames, since ID1 is input and also ID1 is input in latest two frames, the proper-detection deciding unit 32 outputs ID1. In the sixth frame, ID1 and ID3 are input, and ID1 is also input in latest two frames. Therefore, ID1 is output. However, since ID3 is not input in latest two frames, ID3 is not output.

(Example 2)

Next, another example of the operation of the proper-detection deciding unit 32 is described with reference to FIG. 6. FIG. 6 is a view showing, in a table form, an example of data that is input and output by the proper-detection deciding unit 32, for each frame. In the example of FIG. 6, when a face image detected this time is also detected in latest one frame, that is, when a face image is detected continuously in two frames, the proper-detection deciding unit 32 decides that the face image is a properly detected face image.

In the example of FIG. 6, ID1 is input in the first frame, but latest one frame is not present. Therefore, the proper-detection deciding unit 32 does not output any face ID, by deciding that a face image has not been detected. In the second, fourth, sixth, eighth, tenth, and twelfth frames, since no face ID has been input as undetected, the proper-detection deciding unit 32 does not output any face ID, by deciding that a face image has not been detected. In the third, fifth, seventh, ninth, eleventh, and thirteenth frames, although new ID2 to ID7 are input respectively, no face ID is input in latest one frame, and therefore, no face ID is output. As a result, the proper-detection deciding unit 32 does not output any face ID, by deciding that a face image has not been detected. In the fourteenth and fifteenth frames, ID7 is input and ID7 is also input in latest one frame. Therefore, the proper-detection deciding unit 32 outputs ID7.

Therefore, in the present example, the face detecting unit 31 detects a face image in the first, third, fifth, seventh, ninth, eleventh, and thirteenth to fifteenth frames. However, the detection-frame generating unit 33 generates a detection frame in only the fourteenth and fifteenth frames in which the face image (ID7) is continuously detected in two frames. Accordingly, a detection frame is not displayed in the first to thirteenth frames, and is displayed in the fourteenth and fifteenth frames. As a result, flash display of a detection frame in the first to twelfth frames can be prevented, and reduction in a display quality can be prevented.

Next, further embodiments of the present invention are described. A digital camera 10 according to one or more embodiments of the present invention has a configuration similar to that of the digital camera 10 shown in FIG. 1, except that a decision process of the proper-detection deciding unit 32 is different. Configurations and processing operations similar to those described above are attached with the same reference symbols, and their descriptions are omitted.

In one or more embodiments of the present invention, the proper-detection deciding unit 32 refers to the detection-history memory unit 40, and decides whether a face ID received from the face detecting unit 31 is included in detection history of at least a predetermined number (two, for example) of frames in latest predetermined number (four, for example) of frames. When a face ID is included in the detection history, the proper-detection deciding unit 32 decides the detection as proper detection, and transmits the face ID to the detection-frame generating unit 33. On the other hand, when a face ID is not included in the detection history, the proper-detection deciding unit 32 decides the detection as not proper detection, and omits transmission of the face ID to the detection-frame generating unit 33.

(Example 3)

Next, an example of the operation of the proper-detection deciding unit 32 according to one or more embodiments of the present invention is described with reference to FIG. 7. FIG. 7 is a view showing, in a table form, an example of data that is input and output by the proper-detection deciding unit 32, for each frame. In the example shown in FIG. 7, when a face image detected this time is detected in at least two frames out of latest four frames, the proper-detection deciding unit 32 decides that the face image is a properly detected face image.

In the example of FIG. 7, latest two frames are not present in the first and second frames. Therefore, the proper-detection deciding unit 32 does not output any face ID, by deciding that a face image has not been detected. In the third and fourth frames, ID1 is input in only one frame out of latest frames, and therefore, no face ID is output. As a result, the proper-detection deciding unit 32 does not output any face ID, by deciding that a face image has not been detected. In the fifth to seventh frames, ID1 is input in two frames out of latest four frames. Therefore, the proper-detection deciding unit 32 outputs ID1.

In the present example, although the face detecting unit 31 does not detect a face image in the fifth frame, the face detecting unit 31 detects the same face image (ID1) in two frames out of latest four frames. Therefore, the detection-frame generating unit 33 generates a detection frame. Accordingly, delay in display of a detection frame due to a temporary failure in detection of a face image can be prevented.

(Example 4)

Next, another example of the operation of the proper-detection deciding unit 32 according to one or more embodiments of the present invention is described with reference to FIG. 8. FIG. 8 is a view showing, in a table form, an example of data that is input and output by the proper-detection deciding unit 32, for each frame. In the example shown in FIG. 8, when a face image detected this time is detected in at least three frames out of latest five frames, the proper-detection deciding unit 32 decides that the face image is a properly detected face image.

In the example of FIG. 8, latest three frames are not present in the first and second frames. Therefore, the proper-detection deciding unit 32 does not output any face ID, by deciding that a face image has not been detected. In the third frame, although only latest three frames are present, ID1 is input in three frames. Therefore, the proper-detection deciding unit 32 outputs ID1. In this way, it is not necessary to check detection history of all latest five frames.

In one or more of the above embodiments, although the proper-detection deciding unit 32 refers to detection history of a latest few frames, the proper-detection deciding unit 32 may also refer to a latest dozen of frames.

Next, further embodiments of the present invention are described. A digital camera 10 according to one or more embodiments of the present invention has a configuration to that of the digital camera 10 shown in FIG. 1, except that a decision process of the proper-detection deciding unit 32 is different. Configurations and processing operations similar to those described above are attached with the same reference symbols, and their descriptions are omitted.

In one or more embodiments of the present invention, the proper-detection deciding unit 32 refers to the detection-history memory unit 40, and decides whether a face ID received from the face detecting unit 31 is included in detection history during a latest predetermined period (two seconds, for example). When a face ID is included in the detection history, the proper-detection deciding unit 32 decides the detection as proper detection, and transmits the face ID to the detection-frame generating unit 33. On the other hand, when a face ID is not included in the detection history, the proper-detection deciding unit 32 decides the detection as not proper detection, and omits transmission of the face ID to the detection-frame generating unit 33.

(Example 5)

Next, an example of the operation of the proper-detection deciding unit 32 according to one or more embodiments of the present invention is described with reference to FIG. 9. FIG. 9 is a view showing, in a table form, an example of data that is input and output by the proper-detection deciding unit 32, for each 0.2 second. In the example shown in FIG. 9, when a face image detected this time is detected continuously during latest two seconds, the proper-detection deciding unit 32 decides that the face image is a properly detected face image.

In the example of FIG. 9, although ID1 is continuously input, a face ID is not output during two seconds from the beginning. Therefore, the proper-detection deciding unit 32 does not output any face ID, by deciding that a face image has not been detected. Since ID1 is input during latest two second, the proper-detection deciding unit 32 outputs ID after 2.2 seconds from the beginning.

In this way, the proper-detection deciding unit 32 can also make decision in a time unit in place of a frame unit.

(Example of Realization by Software)

The control block (particularly, the controller 20) of the digital camera 10 may be realized by a logic circuit (hardware) constituted by an integrated circuit (IC chip) and the like, or may be realized by software using a CPU (Central Processing Unit).

In the latter case, the digital camera 10 includes the CPU that executes instructions of programs as software for realizing each function, a ROM (Read Only Memory) or a storage device (these are referred to as "recording mediums") in which the programs and various data are recorded to be able to be read by a computer (or the CPU), and a RAM (Random Access Memory) that develops the programs. Then, the computer (or the CPU) executes the programs by reading the programs from the recording mediums. For the recording mediums, it is possible to use "non-transitory tangible media" such as a tape, a disc, a card, a semiconductor memory, and a programmable logic circuit. The programs may be supplied to the computer via a transmittable arbitrary transmission medium (a communication network, a broadcasting wave, and the like). One or more embodiments of the present invention can be also realized in a mode of a data signal embedded in a carrier wave in which the programs are embodied by electronic transmission.

The present invention is not limited to the embodiments, and can be variously changed within a range disclosed in claims. Embodiments obtained by suitably combining technical units disclosed in different embodiments are also included in a technical range of the present invention.

For example, in one or more of the above embodiments, a face image of a person, an animal, and the like is detected from a photographed image and is recognized. However, an image of a whole body of a person, an animal, and the like may be detected, and an image of a ball, a vehicle, and other objects may be detected. That is, one or more embodiments of the present invention can be applied to detect an arbitrary target image included in an obtained photographed image.

Above, one or more embodiments of the present invention is applied to a digital camera 10. However, one or more embodiments of the present invention can be applied to an arbitrary electronic device having a photographing unit such as a portable telephone, a smartphone, and a PDA (Personal Digital Assistant).

As described above, the target-image detecting device according to one or more embodiments of the present invention decides whether a detection result of a target image of the same target object is included in a latest predetermined number of detection results. When a detection result of a target image of the same target object is included, the target-image detecting device outputs the detection result as a proper detection. When a detection result of a target image of the same target object is not included, the target-image detecting device does not output the detection result. Therefore, output of a detection result of an erroneously detected target object can be prevented. Consequently, in addition to the face detection, the target-image detecting device can be applied to an arbitrary device that detects a target image such as a ball detection and a vehicle detection from a photographed image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A target-image detecting device configured to detect a target image as a part of photographed images and as an image of a target object from the photographed images, the target-image detecting device comprising:
  a memory that stores information;
  an obtaining unit that sequentially obtains a plurality of the photographed images that form a moving image;
  a detector that detects a target image included in the photographed images obtained by the obtaining unit, generates a detection result, and accumulates the generated detection result in the memory as detection history; and
  a deciding unit that:
  refers to the detection history of the memory,
  decides whether a detection result of a target image of the same target object is included in a latest predetermined number of detection results, outputs the detection result when the detection result is included, and
  does not output the detection result when the detection result is not included, wherein the detector accumulates identification information for identifying the detected target image in the memory by relating the identification information to the detection result, wherein, when a target image of which a target object detected this time is the same as that of the target image detected in the past, the detector accumulates, in the memory, identification information that is the same as identification information of the target image detected in the past by relating the identification information to a detection result of the target image detected this time, and
  wherein the deciding unit makes the decision by using the identification information of the target image.

2. The target-image detecting device according to claim 1, wherein the deciding unit decides whether a detection result of a target image of the same target object is included in at least a predetermined number of detection results during a latest predetermined period.

3. A digital camera comprising:
  a photographing unit that performs photographing of a subject and generates a plurality of photographed images that form a moving image;
  a display that displays information;
  the target-image detecting device according to claim 2; and
  a synthesizer that synthesizes a detection mark indicating detection of the target image with the photographed image and makes the display display the synthesized image, based on the detection result from the target-image detecting device.

4. A digital camera comprising:
  a photographing unit that performs photographing of a subject and generates a plurality of photographed images that form a moving image;
  a display that displays information;
  the target-image detecting device according to claim 1; and
  a synthesizer that synthesizes a detection mark indicating detection of the target image with the photographed image and makes the display display the synthesized image, based on the detection result from the target-image detecting device.

5. A digital camera comprising:
  a photographing unit that performs photographing of a subject and generates a plurality of photographed images that form a moving image;
  a display that displays information;
  the target-image detecting device according to claim 1; and
  a synthesizer that synthesizes a detection mark indicating detection of the target image with the photographed image and makes the display display the synthesized image, based on the detection result from the target-image detecting device.

6. A control program stored on a non-transitory computer-readable medium for controlling a target-image detecting device configured to detect a target image as a part of photographed images and as an image of a target object from the photographed images, that causes a computer to perform:
  sequentially obtaining a plurality of the photographed images that form a moving image;
  detecting a target image included in the obtained photographed images, generating a detection result and accumulating the generated detection result in memory as detection history;
  referring to the detection history of the memory and deciding whether the detection result of the target image of the same target object is included in a latest predetermined number of detection results;
  outputting the detection result when the detection result is included; and
  not outputting the detection result when the detection result is not included, wherein the detecting the target image includes accumulating identification information for identifying the detected target image in the memory by relating the identification information to the detection result,
  wherein, when a target image of which a target object detected this time is the same as that of the target image detected in the past, the detecting the target image includes accumulating, in the memory, identification information that is the same as identification information of the target image detected in the past by relating the identification information to a detection result of the target image detected this time, and
  wherein deciding whether the detection result of the target image of the same target object is included in the latest predetermined number of detection results includes making the decision by using the identification information of the target image.

7. A method for controlling a target-image detecting device configured to detect a target image as a part of photographed images and as an image of a target object from the photographed images, the method comprising:
- sequentially obtaining via a computer a plurality of the photographed images that form a moving image;
- detecting a target image included in the obtained photographed images, generating a detection result and accumulating the generated detection result in memory as detection history;
- referring to the detection history of the memory and deciding whether the detection result of the target image of the same target object is included in a latest predetermined number of detection results;
- outputting the detection result when the detection result is included and displaying on a display a synthesized image synthesized based on the detection result; and
- not outputting the detection result when the detection result is not included, wherein the detecting the target image includes accumulating identification information for identifying the detected target image in the memory by relating the identification information to the detection result, wherein, when a target image of which a target object detected this time is the same as that of the target image detected in the past, the detecting the target image includes accumulating, in the memory, identification information that is the same as identification information of the target image detected in the past by relating the identification information to a detection result of the target image detected this time, and
- wherein deciding whether the detection result of the target image of the same target object is included in the latest predetermined number of detection results includes making the decision by using the identification information of the target image.

* * * * *